(12) United States Patent
Wang

(10) Patent No.: US 11,425,641 B2
(45) Date of Patent: Aug. 23, 2022

(54) BASEBAND PROCESSING COMBINED BPC CAPABILITY CONFIGURATION METHOD AND DEVICE, BASE STATION AND COMPUTER STORAGE MEDIUM

(71) Applicant: ZTE CORPORATION, Guangdong (CN)

(72) Inventor: Xin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 65 days.

(21) Appl. No.: 17/060,949

(22) Filed: Oct. 1, 2020

(65) Prior Publication Data

US 2021/0022074 A1 Jan. 21, 2021

Related U.S. Application Data

(63) Continuation of application No. PCT/CN2019/080360, filed on Mar. 29, 2019.

(30) Foreign Application Priority Data

Apr. 4, 2018 (CN) .......................... 201810299706.0

(51) Int. Cl.
*H04W 28/02* (2009.01)
*H04W 48/20* (2009.01)

(52) U.S. Cl.
CPC ....... *H04W 48/20* (2013.01); *H04W 28/0215* (2013.01)

(58) Field of Classification Search
CPC ... H04W 48/20; H04W 28/0215; H04W 8/22; H04W 88/085; H04W 92/12;
(Continued)

(56) References Cited

U.S. PATENT DOCUMENTS

2019/0357084 A1\* 11/2019 Chou .................. H04L 41/0806

FOREIGN PATENT DOCUMENTS

CN 103582179 A 2/2014

OTHER PUBLICATIONS

AT&T, Remaining details of Inter-Node RRC messages for EN-DC27 Nov.-Dec. 1, 2017, 3GPP TSG-RAN WG2#100, R2-1712501, Reno, Nevada, USA (Year: 2017).\*
(Continued)

*Primary Examiner* — Said M Elnoubi
(74) *Attorney, Agent, or Firm* — Foley & Lardner LLP

(57) ABSTRACT

Disclosed are a baseband processing combination (BPC) capability configuration method and device, a base station and a computer storage medium. The base station includes a network element and a second network element connected to the first network element. The first network element and the second network element are separately deployed, the first network element is responsible for radio resource management, and the second network element is responsible for underlying radio transmission management. In the process of a UE accessing the second network element of the base station, the second network element of the base station selects a BPC for the UE, and the base station can then schedule the UE according to the BPC selected by the second network element for the UE and perform necessary radio resource configuration.

18 Claims, 6 Drawing Sheets

(58) Field of Classification Search
CPC ... H04W 72/0453; H04W 8/24; H04W 72/04; H04W 88/08; H04W 24/02; H04W 72/12; H04W 36/14; H04W 84/042; H04W 76/27; H04W 8/20; H04W 76/10; H04W 36/22; H04W 72/044; H04W 72/0446; H04W 72/082; H04W 36/06; H04W 28/08; H04W 88/12; H04W 72/00; H04W 36/0069; H04W 8/18; H04W 36/34; H04W 28/16; H04W 28/18; H04W 36/24; H04W 16/10; H04W 72/046; H04W 72/1205; H04W 28/26; H04L 5/001
See application file for complete search history.

(56) References Cited

OTHER PUBLICATIONS

CMCC, UE initial access procedure for CU-DU architecture, Nov. 27-Dec. 1, 2017, 3GPP TSG-RAN WG3 #98, R3-174663, Reno, Nevada, USA (Year: 2017).*

3GPP TS 38.473 V15.0.0, Technical Specification Group Radio Access Network; NG-RAN; F1 application protocol (F1AP), Release 15. (Year: 2017).*

International Search Report and Written Opinion for PCT App. No. PCT/CN2019/080360 dated May 30, 2019 (with English translation, 8 pages).

Nokia: "TP from Email Discussion of Email Discussion [101 #06][NR] 38.331 CR Part 6." 3GPP TSG-RAN WG2 Meeting #101, R2-1804130, Mar. 2, 2018 (Mar. 2, 2018), Athens, Greece (14 pages).

Qualcomm Incorporated: "Summary for Email Discussion [100#32][NR] UE Capabilities" 3GPP TSG-RAN WG2 Meeting NR Adhoc-1801, R2-1800909, Jan. 26, 2018 (Jan. 26, 2018), Vancouver, Canada (16 Pages).

ZTE et al.,: "Further Clarifications on BPC Coordination" 3GPP TSG-RAN WG2 Meeting#I0I, R2-1802700, Mar. 2, 2018 (Mar. 2, 2018), Athens, Greece (8 Pages).

3GPP: Technical Specification Group Radio Access Network; NG-RAN; F1 application protocol (F1AP) (release 15) 3GPP TS 38.473 V15.0.0 (Dec. 2017); Sophia-Antipolis Cedex, France; Jan. 18, 2018 (90 pages).

AT&T: "Remaining details of Inter-Node RRC messages for EN-DC" 3GPP TSG-RAN WG2 #100; R2-1712501; Dec. 1, 2017; Reno, Nevada, USA (3 pages).

CMCC: "UE initial access procedure for CU-DU architecture" 3GPP TSG-RAN WG3 #98; R3-174663; Dec. 1, 2017; Reno, Nevada (2 pages).

Extended European Search Report for EP Appl. No. 19781978.2, dated May 7, 2021 (12 pages).

Huawei et al.: "UE BPC capability coordination for MR DC" 3GPP TSG-RAN2 Meeting AH hoc 1801; R2-1800740; Jan. 26, 2018; Vancouver, Canada (2 pages).

Huawei: "F1AP procedures for RRC Connection Setup" 3GPP TSG-RAN3 Meeting #96; R3-171846; May 19, 2017; Hangzhou, China (3 pages).

NTT Docomo, Inc.: "Fallback mechanism for baseband processing combination" 3GPP TSG-RAN WG2 #100; R2-1712851; Dec. 1, 2017; Reno, USA (8 pages).

Qualcomm Inc.: "CA Capability Signaling Overview" 3GPP TSG-RAN WG4 RAN4 #86; R4-1802826; Mar. 2, 2018; Athens, Greece (15 pages).

* cited by examiner

BASEBAND PROCESSING COMBINED BPC CAPABILITY CONFIGURATION METHOD AND DEVICE, BASE STATION AND COMPUTER STORAGE MEDIUM

CROSS-REFERENCE TO RELATED APPLICATIONS

This application claims the benefit of priority under 35 U.S.C. § 120 as a continuation of PCT Patent Application No. PCT/CN2019/080360, filed on Mar. 29, 2019, which claims priority to Chinese patent application no. 201810299706.0, filed on Apr. 4, 2018, the disclosure of each of which is incorporated herein by reference in its entirety.

TECHNICAL FIELD

The present application relates to the communication field, for example, to a baseband processing combination (BPC) capability configuration method and device, a base station and a computer storage medium.

BACKGROUND

The generation Node B (gNB) which adopts a new radio (NR) access technology over a radio interface is deployed in the radio access network (RAN) of the fifth generation (5G) communication system. Referring to the illustration of FIG. 1, a gNB may be comprised of one centralized unit (CU) and at least one distributed unit (DU). Such base station is also referred to as a separated base station or a distributed base station. Such base station is also applicable to a dual connectivity (DC) architecture, and in the DC architecture, the gNB in the form of CU-DU may be a master node (MN) and/or a secondary node (SN).

When a serving base station includes at least one base station deployed in the form of CU-DU, there is currently no solution to how to select a baseband processing combination (BPC) capability used by a user equipment (UE).

SUMMARY

The embodiments of the present application provide a BPC capability configuration method and device, a base station and a computer storage medium to mainly solve the technical problem of how to achieve the selection of a BPC capability for a user equipment.

A baseband processing combination (BPC) capability configuration method is provided in the embodiments of the present application and includes steps described below.

In an access process of a user equipment, a second network element of a base station selects a BPC for the user equipment.

The base station includes a first network element and the second network element connected to the first network element, and the first network element and the second network element are separately deployed.

A baseband processing combination (BPC) capability configuration device is further provided in the embodiments of the present application, is configured in a second network element of a base station, and includes a configuration module.

The configuration module is configured to select a BPC for a user equipment in a process of the user equipment accessing the second network element of the base station.

The base station includes a first network element and the second network element connected to the first network element, and the first network element and the second network element are separately deployed.

A base station is further provided in the embodiments of the present application, and includes a first network element and a second network element connected to the first network element. The first network element and the second network element are separately deployed, the first network element is at least responsible for radio resource management, and the second network element is at least responsible for lower layer radio transmission management.

The second network element includes a processor, a memory and a communication bus.

The communication bus is configured to implement connection communication between the processor and the memory.

The processor is configured to execute one or more programs stored in the memory to implement the baseband processing combination (BPC) capability configuration method described above.

To solve the above technical problem, a computer storage medium is further provided in the embodiments of the present application, and is configured to store one or more programs. The one or more programs are executed by a processor for implementing the baseband processing combination (BPC) capability configuration method described above.

DETAILED DESCRIPTION

Embodiments of the present application will be further described below in detail by use of implementations and with reference to drawings. It is to be understood that the embodiments described herein are merely intended to explain the present application and not to limit the present application.

Embodiment One

Figure 1:
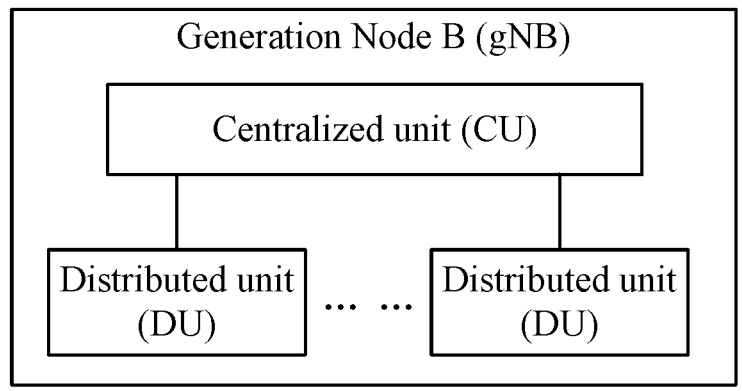
FIG. 1 is a structure diagram of a gNB.
Figure 2:
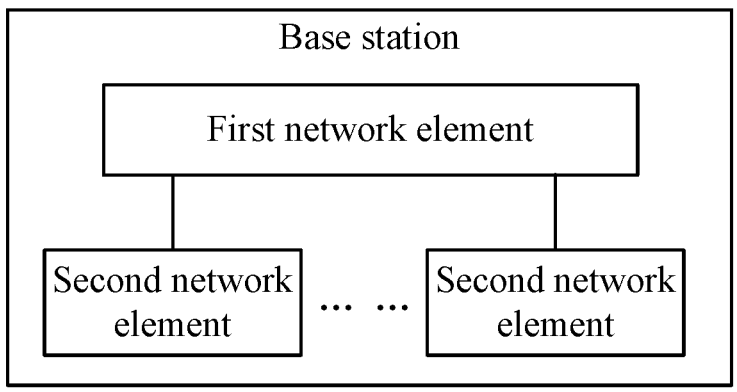
FIG. 2 is a structure diagram of a base station according to embodiment one of the present application.

Referring to FIG. 2, the base station in this embodiment includes a first network element and a second network element connected to the first network element. It should be understood that in this embodiment, the number of second network elements under the first network element may be flexibly set. One second network element may be provided, or two or more second network elements may be included. The first network element and the second network element are separately deployed, and the second network element may be configured in a distributed manner. The first network element is at least responsible for radio resource management (RRM). In some application scenarios, the first network element may also be configured with radio resources of at least one of a radio resource control (RRC) layer, a service data adaptation protocol (SDAP) sublayer in layer 2 (L2) or a packet data convergence protocol (PDCP) sublayer in L2. The second network element is at least responsible for underlying radio transmission management. For example, in some application scenarios, the second network element may also be responsible for configuring radio resources of at least one of a radio link control (RLC) sublayer in L2, a medium access control (MAC) sublayer in L2 or a physical layer and communicates with the UE over a Uu radio interface. Of course, it should be understood that in this embodiment, the functions of the first network element and the second network element may be flexibly set and are not limited to the functions exemplified above.

A baseband processing combination (BPC) capability configuration method provided in this embodiment includes: in an access process of a UE, a second network element of a base station selects a BPC for the UE. That is, in a case where the base station of the structure shown in FIG. 2 is provided as a serving base station in this embodiment, when the UE accesses the base station, the second network element of the base station selects the BPC for the UE. Moreover, since the second network element is at least responsible for underlying radio transmission management, the second network element selects a BPC for the UE, and the base station can then schedule the UE according to the BPC selected by the second network element for the UE and perform necessary radio resource configuration, etc.; the BPC selection when the UE accesses the separated base station is achieved. Moreover, since the second network element is at least responsible for underlying radio transmission management, the second network element selecting the BPC for the UE can also avoid a case of selection of a wrong BPC due to the fact that the first network element does not know the situation of the underlying radio resource and environment, thus enabling the BPC that should be currently used by the UE to be effectively and reasonably selected in an access network. Thereby, when the UE is scheduled, full use can be made without exceeding the capability range of the UE, achieving reasonable maximization of the performance of the UE.

In this embodiment, the manner of configuring a BPC for the UE by the second network element p can be flexibly set according to requirements. For ease of understanding, this embodiment is illustrated in several exemplary configurations.

Figure 3:
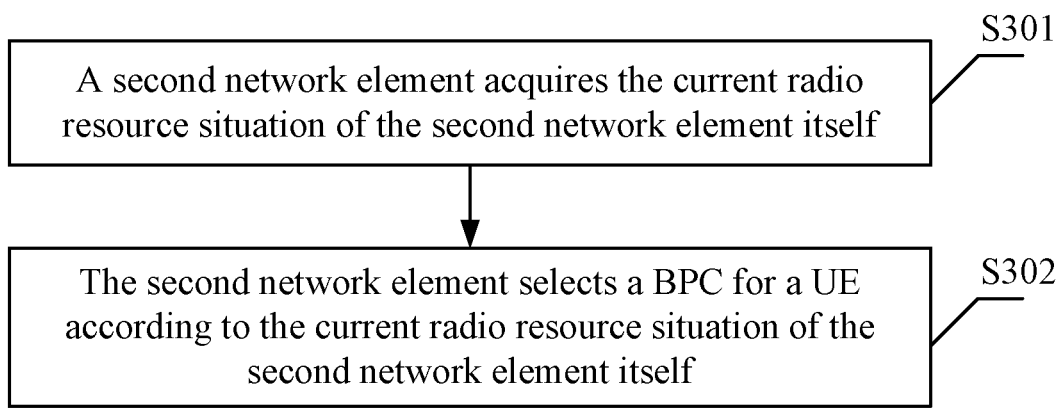
FIG. 3 is a flowchart of a BPC capability configuration according to embodiment one of the present application.

In this embodiment, the step in which the second network element selects the BPC for the UE may include: the second network element selecting the BPC for the UE according to a current radio resource situation of the second network element itself. At this time, the second network element is necessarily to acquire the current radio resource situation of the second network element itself. For the configuration process, reference is made to FIG. 3. The configuration process includes step S301 and step S302.

In step S301, the second network element acquires the current radio resource situation of the second network element itself.

It should be understood that in this embodiment, when the second network element acquires the current radio resource situation of the second network element itself, the current radio resource situation of the second network element may be detected and acquired by the second network element itself and may also be acquired from another network element or device that can detect and acquire the current radio resource situation of the second network element. Moreover, the radio resource situation in this embodiment may include at least one radio resource situation affecting the BPC selection for the UE. In an embodiment, a radio resource that does not directly affect the BPC selection for the UE may also be included at the same time. For example, in one example, the radio resource includes, but is not limited to, a network element-side radio frequency capability situation and an antenna usage situation.

In step S302, the second network element selects a BPC for the UE according to the current radio resource situation of the second network element itself.

For example, when the current radio resource situation of the second network element is that a radio frequency capability is greater than a preset radio frequency capability threshold and an antenna idle rate is greater than a preset idle rate threshold, a BPC with a higher level of multiple-input multiple-output (MIMO) may be selected on the premise that the UE capability is not exceeded. When a radio frequency capability is less than or equal to a preset radio frequency capability threshold and/or an antenna idle rate is less than or equal to a preset idle rate threshold, a BPC with a lower level of MIMO may be selected. For example, the selection can be flexibly set according to specific communication environment, specific application scenario requirements, etc.

In this embodiment, the second network element selects the BPC for the UE, that is, selects a BPC that should be currently used for the UE. The "BPC that should be currently used by the UE" in this embodiment refers to that when the second network element performs transmission scheduling on the UE, the corresponding parameters do not go beyond various parameter values included in the BPC selected for the UE. In this embodiment, the parameter values included in the BPC include, but are not limited to, a bandwidth class, subcarrier spacing, a MIMO layer, etc. It should also be understood that in this embodiment, the number and content of parameter values included in the BPC can be flexibly set and adjusted according to specific requirements.

In this embodiment, since the first network element is at least responsible for radio resource management (RRM), the first network element can know the overall network environment. Therefore, in one example of this embodiment, the first network element can converge the BPCs in the list of BPCs supported by the UE, and send a BPC convergence list obtained after the convergence processing to the second network element. The BPC convergence list includes BPCs currently applicable to the UE and selected by the first network element from the list of BPCs supported by the UE, so that the second network element can select an appropriate BPC in the BPC convergence list, thus improving the accuracy and efficiency of BPC selection performed by the second network element.

In this embodiment, according to the current radio resource configuration of the UE and at least one of the service requirements of the UE, the first network element can screen the BPCs in the list of BPCs supported by the UE to obtain a BPC convergence list, and the obtained BPC convergence list generally includes at least one BPC currently applicable to the UE. The first network element can send the obtained BPC convergence list to the second network element through an interface message between network elements.

In this embodiment, when the second network element receives the BPC convergence list from the first network element, the second network element can select a BPC for the UE from the received BPC convergence list when selecting the BPC for the UE. In an embodiment, the step in which the second network element selects the BPC for the UE according to the current radio resource situation of the second network element itself may include that: the second network element selects the BPC for the UE from the BPC convergence list according to the current radio resource situation of the second network element itself.

In this embodiment, the list of BPCs supported by the UE can be acquired from the capability information of the UE, and the list of BPCs includes a plurality of BPCs supported by the UE. For example, in one example of this embodiment, the capability information of the UE includes information such as a frequency band that the UE can support, a frequency band combination that the UE can support, and a BPC capability that the UE can support.

In this embodiment, the step in which the first network element performs convergence processing on the list of BPCs supported by the UE may also be an optional step, that is, the first network element may not perform convergence processing on the list of BPCs supported by the UE. In this case, the second network element directly selects a BPC from the list of BPCs supported by the UE. In one example, the second network element may first acquire at least one of the current serving frequency band or the current serving cell of the UE, and then select a BPC for the UE from the BPCs supported by the UE according to the at least one of the current serving frequency band or the current serving cell of the UE. In an embodiment, the second network element can select a BPC for the UE according to the current radio resource situation of the second network element itself and in combination with at least one of the current serving frequency band or the current serving cell of the UE, thus ensuring the accuracy of BPC selection.

In this embodiment, after the second network element configures the BPC for the UE, the method also includes sending the BPC selected for the UE to the first network element for the first network element to perform at least one of the following operations: saving the BPC, performing various management based on the BPC, etc.

In an embodiment, the base station may also be adapted to a DC architecture, and in this embodiment, the base station may act as a master node (MN) or a secondary node (SN) in the DC architecture.

In the DC architecture, when the base station acts as an MN, in an embodiment, when the first network element performs convergence processing on the BPCs supported by the UE and obtains and sends the range of converged BPCs to the second network element for indication, the adaptation to the BPC used by the SN in the DC architecture should be considered. That is, a BPC in the BPC convergence list sent by the first network element to the second network element is adapted to the BPC used by the secondary node in the DC architecture. In this way, it can be ensured that the BPC selected by the second network element for the UE is adapted to the BPC used by the SN in the DC architecture.

In the DC architecture, when the base station acts as an SN, in an embodiment, when the first network element performs convergence processing on the BPCs supported by the UE and obtains and sends the range of converged BPCs to the second network element for indication, the range of converged BPCs indicated by the first network element to the second network element cannot exceed the range of BPCs available on the SN side indicated by the MN in the DC architecture. That is, the BPC in the BPC convergence list sent by the first network element to the second network element is within the BPC range designated for the secondary node by the master node in the DC architecture. In this way, it can be ensured that the BPC selected by the second network element for the UE is adapted to the BPC used by the SN in the DC architecture.

In this embodiment, the adaptation of two BPCs refers to indicating, in the UE radio capability information, when one network element (e.g., MN) selects a BPC, the corresponding other network element (e.g., SN) may select one or more BPCs corresponding to the BPC selected by the previous one network element. In an embodiment, a parameter used for the DC can be defined in the UE capability. For example, it is defined that when the first network element uses a frequency band 1, the second network element may use a frequency band 2, which is referred to as adaptation of the frequency band 1 to the frequency band 2 in this embodiment. In an embodiment, it may also be defined in the UE capability that when the first network element uses the frequency band 1, scheduling can be performed based on BPC #1/2, and that when the second network element uses the frequency band 2, scheduling can be performed based on BPC #3/4, and then BPC #1/2 may also be referred to as being adapted to BPC #3/4 in this embodiment.

In this embodiment, when at least two second network elements are connected to the first network element of the second network element of the base station, the UE may be connected to only one of the second network elements, or may be connected to two or more second network elements at the same time according to requirements. In an embodiment, at this time, a plurality of second network elements connected to the UE each can perform the above-mentioned process of selecting the BPC for the UE, and the first network element can indicate the list of BPCs to at least one of these second network elements; in some examples, the first network element may indicate the lists of BPCs to each of the second network elements. In this embodiment, after these second network elements select BPCs for the UE, the plurality of second network elements can directly coordinate, through the first network element or between the second network elements, the BPCs selected for the UE, so as to ensure that the sum of UE capabilities occupied by these second network elements when the UE is scheduled does not exceed the maximum BPC capability that the UE should currently support. For example, when the BPC of the UE supports a maximum of 6 levels of MIMO, the MIMO occupied by the respective second network elements cannot exceed 6 levels.

In this embodiment, for ease of understanding, a description is given by taking as an example the UE being connected to two second network elements at the same time. In this example, the first network element is referred to as a network element A, and the two network elements each connected to the UE are referred to as a network element B and a network element C respectively. It is assumed that the network element A sends BPC convergence lists to the network element B and network element C respectively, and the network element B and the network element C respectively select BPCs for the UE through the BPC selection method described above. Moreover, in one application scenario, the network element B and the network element C respectively send the selected BPCs to the network element A. At this time, the network element A can determine whether the BPC selected for the UE by the network element B affects the BPC selected for the UE by the network element C, and/or whether the BPC selected for the UE by the network element C affects the BPC selected for the UE by the network element B. If the BPC selected for the UE by the network element B affects the BPC selected for the UE by the network element C, and/or the BPC selected for the UE by the network element C affects the BPC selected for the UE by the network element B, a BPC change notification is sent to the affected network element B or network element C to notify the network element B or network element C to perform BPC re-selection, or the BPC convergence list sent to the network element B or network element C is modified according to the effect so that network element B or network element C can perform BPC re-selection according to the received new list of BPCs. In another application scenario, after the network element B and the network element C respectively select BPCs for the UE through the BPC selection method described above, at least one of the network element B or network element C sends the BPC selected for the UE to the other network element. For example, the network element B sends, directly or through the network element A, the BPC selected for the UE by the network element B itself to the network element C. At this time, the network element C can determine, according to the BPC selected for the UE by the network element B and the BPC selected for the UE by the network element C itself, whether the BPC previously selected for the UE by the network element C itself needs to be re-selected.

Through the above exemplary coordination among the network element A, the network element B and the network element C, when the network element B and network element C schedule the UE, the occupied UE radio capabilities will not exceed the maximum BPC capability that the UE can support for the servicing frequency band. It should be understood that when the UE is connected to three or more second network elements under the first network element at the same time, the selection negotiation process of the BPC can be analogized on the basis of the above example and will not be repeated here.

Figure 4:
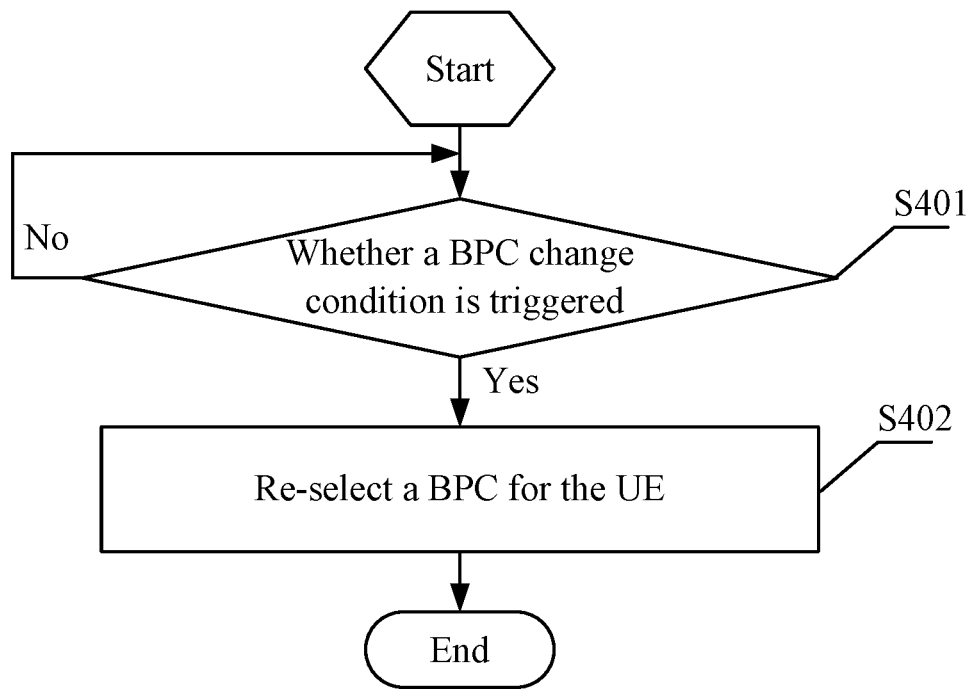
FIG. 4 is a flowchart of a BPC reconfiguration determination according to embodiment one of the present application.

According to the above example, in this embodiment, after configuring the BPC for the UE during the initial access process of the UE, the second network element may also need to re-select the BPC for the UE. That is, after the second network element selects the BPC for the UE, the following determination process shown in FIG. 4 is also included. The determination process includes step S401 and step S402.

In step S401, the second network element detects whether a BPC change condition is triggered. If the BPC change condition is triggered, the process proceeds to S402. If the BPC change condition is not triggered, the process proceeds back to S401 to continue the determination.

In step S402, a BPC is re-selected for the UE.

In one example of this embodiment, the BPC change condition includes, but is not limited to, at least one of the conditions described below.

Condition one: Radio resource configuration of the UE changes, and the changed radio resource configuration affects a BPC selection for the UE. In this example, the first network element may adjust the radio resource configuration of the UE (e.g., modifying the serving frequency band of the UE), or other network elements or devices may adjust the radio resource configuration of the UE.

Condition two: BPCs applicable to the UE change. In this example, the first network element may adjust the BPCs applicable to the UE, and the trigger situation for the first network element to adjust the BPCs applicable to the UE can also be flexibly set. For example, in the above example, when the network element A determines that the BPC selected for the UE by the network element C affects the BPC selected for the UE by the network element B, the adjusted new BPC convergence list can be sent to the network element B to change the BPCs currently applicable to the UE.

Condition three: The second network element initiates a BPC re-selection. For example, the second network element may initiate the BPC re-selection when the current radio resource situation of the second network element itself satisfies the BPC re-selection condition, or initiate the BPC re-selection when a preset time period is reached. The initiation condition may be flexibly set.

Condition four: The second network element needs to adjust the BPC previously selected for the UE due to the fact that the second network element detects a BPC selected for the UE by another network element. For example, in the above example, the network element C may determine whether to reconfigure the BPC previously selected for the UE by the network element C itself according to the BPC selected for the UE by the network element B and the BPC selected for the UE by the network element C itself.

In this embodiment, when the BPC change condition includes condition one and condition one is triggered, the manner of re-selecting a BPC for the UE by the second network element includes either manner one or manner two described below.

Manner one: The second network element re-selects a BPC for the UE according to the changed radio resource configuration of the UE (optionally, in combination with the current radio resource situation of the second network element itself), and at this time, the BPC for the UE may be re-selected from a list of BPCs supported by the UE, or the BPC for the UE may be re-selected from a BPC convergence list previously received from the first network element (if the first network element previously sends the BPC convergence list to the second network element by).

Figure 5:
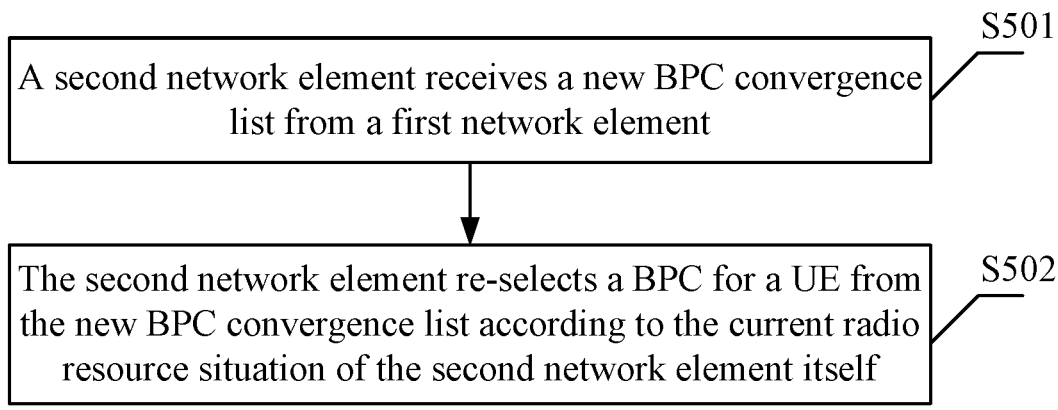
FIG. 5 is a flowchart of a BPC capability configuration based on a BPC convergence list according to embodiment one of the present application.

Manner two: Referring to FIG. 5, step S501 and step S502 are included.

In step S501, the second network element receives a new BPC convergence list from the first network element, where the new BPC convergence list includes BPCs currently applicable to the UE and re-selected by the first network element according to the changed radio resource configuration of the UE.

In step S502, the second network element re-selects a BPC for the UE from the new BPC convergence list (in an embodiment, the BPC for the UE may be re-selected from the BPC convergence list also in combination with the current radio resource situation of the second network element itself).

In this embodiment, when the BPC change condition includes condition two and condition two is triggered, the step in which the second network element re-selects the BPC for the UE includes a step described below.

The second network element re-selects a BPC for the UE from the BPCs currently applicable to the UE (in an embodiment, the re-selection for the UE may be performed also in combination with the current radio resource situation of the second network element itself), for example, the BPC for the UE is re-selected from a new BPC convergence list sent by a new first network element.

In this embodiment, when the BPC change condition includes condition three and condition three is triggered, the step in which the second network element re-selects the BPC for the UE includes a step described below.

The second network element re-selects a BPC from the BPC convergence list or the BPCs supported by the UE, for example, the second network element re-selects the BPC for the UE according to the current radio resource situation of the second network element itself.

In this embodiment, when the BPC change condition includes condition four and condition four is triggered, the step in which the second network element re-selects the BPC for the UE includes a step described below.

The second network element re-selects a BPC for the UE according to the BPC selected for the UE by another network element (in an embodiment, the re-selection for the UE may be performed also in combination with the current radio resource situation of the second network element itself).

After the second network element reconfigures the BPC for the UE, the method also includes sending the BPC re-selected for the UE to the first network element for the first network element to perform at least one of the following operations: saving the BPC, performing various management based on the BPC, etc.

In this embodiment, the second network element is not limited to configuring the BPC for the UE, and it should be understood that other capabilities having similar properties and characteristics to the BPC in this example can also be selected by the second network element by using the method provided in this embodiment.

For a separated base station or a distributed base station having the structure of the first network element and the second network element in this embodiment, various configuration schemes for configuring the BPC for the UE by the second network element of the base station are provided in this embodiment. For example, the coordination of the first network element and the second network element in the BPC selection process can not only avoid selection of a wrong BPC due to the fact that the first network element does not know the situation of the underlying radio resource and environment, but also avoid selection of a wrong BPC due to the fact that the second network element does not know the overall network environment, thus enabling the BPC that should be currently used by the UE to be effectively and reasonably selected in an access network. Thereby, when the UE is scheduled, full use can be made without exceeding the capability range of the UE, achieving reasonable maximization of the performance of the UE.

Embodiment Two

Figure 6:
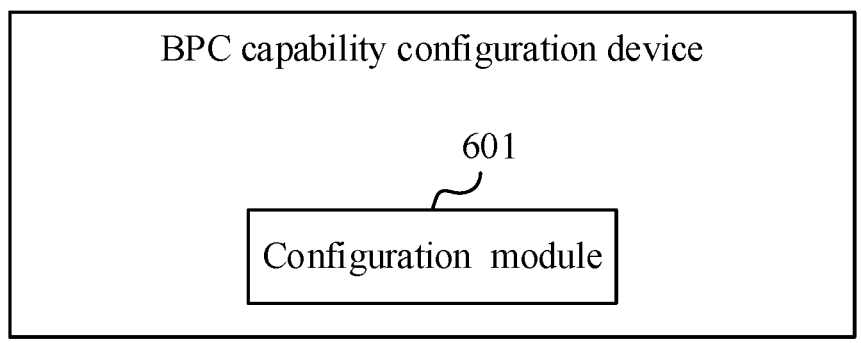
FIG. 6 is structure diagram one of a BPC capability configuration device according to embodiment two of the present application.

A baseband processing combination (BPC) capability configuration device is further provided in this embodiment. The BPC capability configuration device is configured in the second network element of a base station, and includes a configuration module 601 as shown in FIG. 6.

The configuration module 601 is configured to select a BPC for a user equipment in a process of the user equipment accessing the second network element of the base station.

The base station in this embodiment, as illustrated in embodiment one, also includes a first network element and a second network element connected to the first network element. The first network element and the second network element are separately deployed, the first network element is at least responsible for radio resource management, and the second network element is at least responsible for underlying radio transmission management. The specific structures and the specific function of each network element will not be repeated here.

The manner of configuring a BPC for the UE by the configuration module 601 can be flexibly set according to requirements. For ease of understanding, this embodiment is illustrated in several exemplary configurations.

Figure 7:
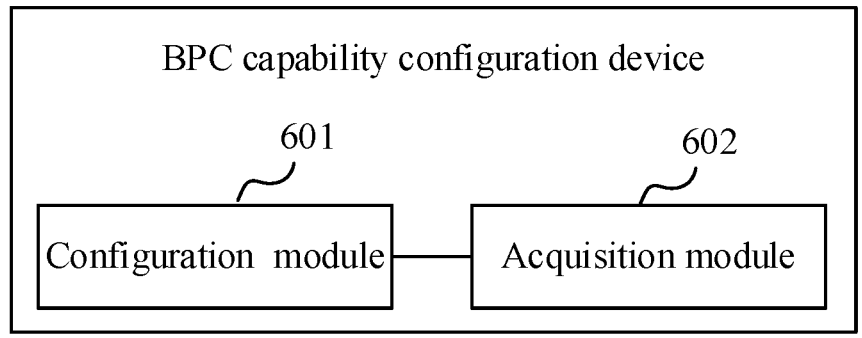
FIG. 7 is structure diagram two of a BPC capability configuration device according to embodiment two of the present application.

In an embodiment, the configuration module 601 selects a BPC for the user equipment according to a current radio resource situation of the second network element. In this case, the current radio resource situation of the second network element is necessarily to be acquired. Thus, as shown in FIG. 7, the BPC capability configuration device in this embodiment further includes an acquisition module 602. The acquisition module 602 is configured to acquire the current radio resource situation of the second network element. It should be understood that in this embodiment, when the acquisition module 602 acquires the current radio resource situation of the second network element, the current radio resource situation of the second network element may be acquired from the second network element and may also be acquired from another network element or device that can detect and acquire the current radio resource situation of the second network element. The radio resource situation in this embodiment may include at least one radio resource situation affecting the BPC selection for the UE, and in an embodiment, may also include a radio resource not directly affecting the BPC selection for the UE. For example, in one example, the radio resource includes, but is not limited to, a network element-side radio frequency capability situation and an antenna usage situation.

In this embodiment, the manner of selecting a BPC for the user equipment by the configuration module 601 according to the current radio resource situation of the second network element includes, but is not limited to, the two manners described below.

Manner One:

In this manner, the acquisition module 602 is further configured to receive a BPC convergence list from the first network element, and as illustrated in embodiment one, the BPC convergence list includes BPCs currently applicable to the user equipment selected by the first network element.

The configuration module 601 is configured to select a BPC for the user equipment from the BPC convergence list (in an embodiment, the BPC selection may be performed in combination with the current radio resource situation of the second network element acquired by the acquisition module 602).

Manner Two:

In this manner, the acquisition module 602 is further configured to acquire at least one of the current serving frequency band or the current serving cell of the user equipment. The serving frequency band may be acquired in various manners. Details are not repeated here.

The configuration module 601 is configured to select a BPC for the user equipment according to at least one of the serving frequency band or the serving cell (in an embodiment, the BPC selection may be performed in combination with the current radio resource situation of the second network element acquired by the acquisition module 602).

In this embodiment, the list of BPCs supported by the UE can be acquired from the capability information of the UE. In one example of this embodiment, the capability information of the UE includes information such as a frequency band that the UE may support, a frequency band combination that the UE may support, and a BPC capability that the UE may support.

In this embodiment, the step in which the first network element performs convergence processing on the list of BPCs supported by the UE may also be an optional step, that is, the first network element may not perform convergence processing on the list of BPCs supported by the UE. In this case, the configuration module 601 directly selects the BPC from the list of BPCs supported by the UE.

Figure 8:
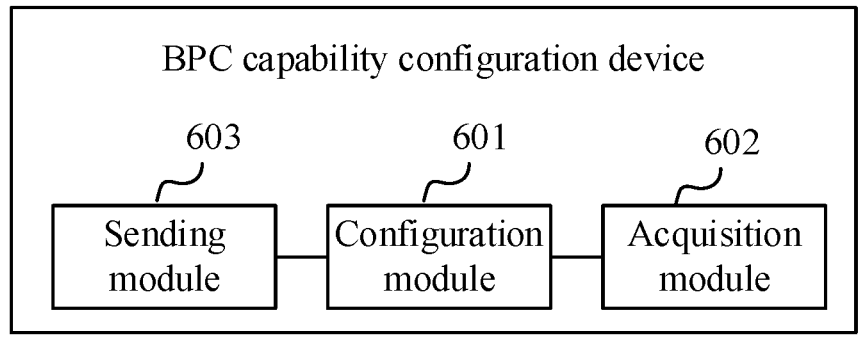
FIG. 8 is structure diagram three of a BPC capability configuration device according to embodiment two of the present application.

Referring to FIG. 8, the BPC capability configuration device in this embodiment further includes a sending module 603. The sending module 603 is configured to: after the configuration module selects the BPC for the UE, send the BPC selected for the UE to the first network element for the first network element to performed one of the following operations: saving the BPC, performing various management based on the BPC, etc.

In an embodiment, the base station may also be adapted to a DC architecture, and in this embodiment, the base station may act as a master node (MN) or a secondary node (SN) in the DC architecture.

In the DC architecture, when the base station acts as an MN, in an embodiment, when the first network element performs convergence processing on the BPCs supported by the UE and obtains and sends the range of converged BPCs to the second network element for indication, the adaptation to the BPC used by the SN in the DC architecture should be considered. That is, a BPC in the BPC convergence list sent by the first network element to the second network element is adapted to the BPC used by the secondary node in the DC architecture. In this way, it can be ensured that the BPC selected by the configuration module 601 for the UE is adapted to the BPC used by the SN in the DC architecture.

In the DC architecture, when the base station acts as an SN, in an embodiment, when the first network element performs convergence processing on the BPCs supported by the UE and obtains and sends the range of converged BPCs to the second network element for indication, the range of converged BPCs indicated by the first network element to the second network element cannot exceed the range of BPCs available on the SN side indicated by the MN in the DC architecture. That is, the BPC in the BPC convergence list sent by the first network element to the second network element is within the BPC range designated for the secondary node by the master node in the DC architecture. In this way, it can be ensured that the BPC selected by the configuration module 601 for the UE is adapted to the BPC used by the SN in the DC architecture.

In this embodiment, when at least two second network elements are connected to the first network element of the second network element of the base station, the UE may be connected to only one of the second network elements, or may be connected to two or more second network elements at the same time according to requirements. In an embodiment, at this time, a plurality of second network elements connected to the UE each can perform the above-mentioned process of selecting the BPC for the UE, and the first network element can indicate the list of BPCs to at least one of these second network elements; in some examples, the first network element may indicate the lists of BPCs to the second network elements respectively. In this embodiment, after these second network elements select BPCs for the UE, the plurality of second network elements can directly coordinate, through the first network element or between the second network elements, the BPCs selected for the UE, so as to ensure that the sum of UE capabilities occupied by these second network elements when the UE is scheduled does not exceed the maximum BPC capability that the UE should currently support. For example, when the BPC of the UE supports a maximum of 6 levels of MIMO, the MIMO respectively occupied by these second network elements cannot exceed 6 levels.

In this embodiment, for ease of understanding, the UE is still connected to two second network elements at the same time by way of example. In this example, the first network element is referred to as a network element A, and the two network elements connected to the UE at the same time are a network element B and a network element C respectively. In this case, the structures of the network element B and network element C may both be the structures illustrated in FIGS. 6-8. It is assumed that the network element A sends BPC convergence lists to the network element B and network element C respectively, and the network element B and network element C respectively configure BPCs for the UE through the BPC selection method described above. Moreover, in one application scenario, the network element B and network element C respectively send the selected BPCs to the network element A. At this time, the network element A can determine whether the BPC selected for the UE by the network element B affects the BPC selected for the UE by the network element C, and/or whether the BPC selected for the UE by network element C affects the BPC selected for the UE by network element B. If the BPC selected for the UE by the network element B affects the BPC selected for the UE by the network element C, and/or the BPC selected for the UE by the network element C affects the BPC selected for the UE by the network element B, a BPC change notice is sent to the affected the network element B or network element C to notify the network element B or network element C to perform BPC re-selection, or the BPC convergence list sent to the network element B or network element C is modified according to the effect, so that the network element B or network element C can perform BPC re-selection according to the received new list of BPCs. In another application scenario, after the network element B and network element C respectively configure BPCs for the UE through the BPC selection method described above, at least one of the network element B or network element C sends the BPC selected for the UE to the other network element. For example, the network element B sends, directly or through the network element A, the BPC selected for the UE to the network element C. At this time, the network element C can determine, according to the BPC selected for the UE by the network element B and the BPC selected for the UE by the network element C itself, whether the BPC previously selected for the UE by the network element C itself needs to be re-selected. Through the above exemplary coordination among the network element A, network element B and the network element C, when the network element B and network element C schedule the UE, the occupied UE radio capabilities will not exceed the maximum BPC capability that the UE can support for the servicing frequency band.

Therefore, in this embodiment, the configuration module 601 is further configured to: after the BPC for the user equipment is selected, re-select the BPC for the user equipment when the BPC change condition is triggered. In one example of this embodiment, the BPC change condition includes, but is not limited to, at least one of the conditions described below.

Condition one: Radio resource configuration of the UE changes, and the changed radio resource configuration affects a BPC selection for the UE. In this example, the first network element may adjust the radio resource configuration of the UE (e.g., modifying the serving frequency band of the UE, etc.), or other network elements or devices may adjust the radio resource configuration of the UE.

Condition two: BPCs applicable to the UE change. In this example, the first network element may adjust the BPCs applicable to the UE, and the trigger situation in which the first network element adjusts the BPCs applicable to the UE can also be flexibly configured. For example, in the above example, when network element A determines that the BPC selected for the UE by network element C affects the BPC selected for the UE by network element B, the adjusted new BPC convergence list can be sent to network element B to thus change the BPCs currently applicable to the UE.

Condition three: The second network element initiates a BPC re-selection.

Condition four: The second network element needs to adjust the BPC previously selected for the UE due to the fact that the second network element detects a BPC selected for the UE by another network element. For example, in the above example, network element C may determine whether to reconfigure the BPC previously selected for the UE by network element C itself according to the BPC selected for the UE by network element B and the BPC selected for the UE by network element C itself.

In this embodiment, when the BPC change condition includes condition one and condition one is triggered, the manner of re-selecting a BPC for the UE by the configuration module 601 includes either manner one or manner two described below.

Manner one: The configuration module 601 re-selects the BPC for the UE according to the changed radio resource configuration of the UE (in an embodiment, may also in combination with the current radio resource situation of the second network element itself), and at this time, the BPC for the UE may be re-selected from a list of BPCs supported by the UE, or the BPC for the UE may be re-selected from a BPC convergence list previously received from the first network element (if the BPC convergence list was previously sent to the second network element by the first network element).

Manner two: Referring to FIG. 5, step S501 and step S502 are included.

In step S501, the acquisition module 602 receives a new BPC convergence list from the first network element, where the new BPC convergence list includes BPCs currently applicable to the UE and re-selected by the first network element according to the changed radio resource configuration of the UE.

In step S502, the configuration module 601 re-selects the BPC for the UE according to the new BPC convergence list (in an embodiment, the BPC for the UE may be re-selected from the BPC convergence list also in combination with the current radio resource situation of the second network element itself).

In this embodiment, when the BPC change condition includes condition two and condition two is triggered, the step in which the configuration module 601 re-selects the BPC for the UE includes a step described below.

The configuration module 601 re-selects the BPC for the UE from the BPCs currently applicable to the UE (in an embodiment, re-selection for the UE may be performed also in combination with the current radio resource situation of the second network element itself), for example, the BPC for the UE is re-selected from a new BPC convergence list sent by a new first network element.

In this embodiment, when the BPC change condition includes condition three and condition three is triggered, the step in which the configuration module 601 re-selects the BPC for the UE includes a step described below.

The configuration module 601 re-selects the BPC from the BPC convergence list or the BPCs supported by the UE, for example, the second network element re-selects the BPC for the UE according to the current radio resource situation of the second network element itself.

In this embodiment, when the BPC change condition includes condition four and condition four is triggered, the step in which the configuration module 601 re-selects the BPC for the UE includes a step described below.

The configuration module 601 re-selects the BPC for the UE according to the BPC selected for the UE by another network element (in an embodiment, the re-selection for the UE may be performed also in combination with the current radio resource situation of the second network element itself).

In this embodiment, the sending module 603 is further configured to: after the configuration module 601 re-selects the BPC for the UE, send the BPC re-selected for the UE by the configuration module 601 to the first network element for the first network element to performed one of the following operations: saving the BPC, performing various management based on the BPC, etc.

In this embodiment, the BPC capability configuration device is not limited to configuring the BPC for the UE, and it should be understood that other capabilities having similar properties and characteristics to the BPC in this example can also be configured by the BPC capability configuration device by using the scheme provided in this embodiment.

In this embodiment, the functions of the configuration module 601, acquisition module 602 and sending module 603 described above can be implemented by a processor or controller in the second network element.

For a separated base station or a distributed base station having the structure of the first network element and the second network element in this embodiment, various configuration schemes for configuring the BPC for the UE by the BPC capability configuration device configured on the second network element are provided for accurately configuring the BPC for the UE, thus enabling the BPC that should be currently used by the UE to be effectively and reasonably selected in an access network. Thereby, when the UE is scheduled, full use can be made without exceeding the capability range of the UE, achieving reasonable maximization of the performance of the UE.

Embodiment Three

A base station is further provided in this embodiment, and includes a first network element and a second network element connected to the first network element. The first network element and the second network element are separately deployed, the first network element is at least responsible for radio resource management, and the second network element is at least responsible for underlying radio transmission management.

Figure 9:
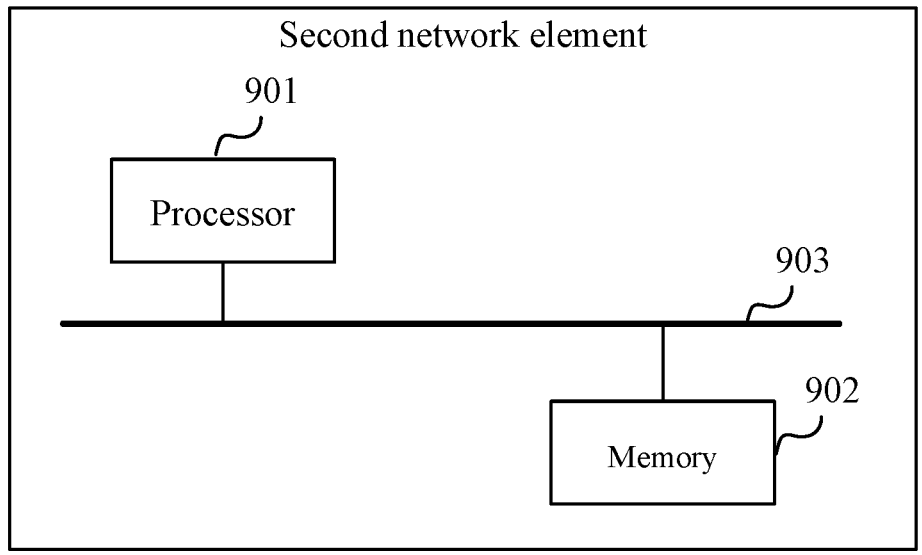
FIG. 9 is a structure diagram of a second network element of a base station according to embodiment three of the present application.

The second network element, as shown in FIG. 9, includes a processor 91, a memory 92 and a communication bus 93.

The communication bus 93 is configured to implement connection communication between the processor 91 and the memory 92.

The processor 91 is configured to execute one or more programs stored in the memory 92 to implement steps of the BPC capability configuration method described in the above embodiment.

A computer-readable storage medium is further provided in this embodiment, may be applied in various communication devices, and is configured to store one or more programs. The one or more programs are executed by one or more processors to implement steps of the BPC capability configuration method described in the above embodiment.

In order to facilitate understanding of the present application, this embodiment further illustrates the present application with several application scenarios of a separate base station including the second network element shown in FIG. 9 as examples.

Scenario One

Figure 10:
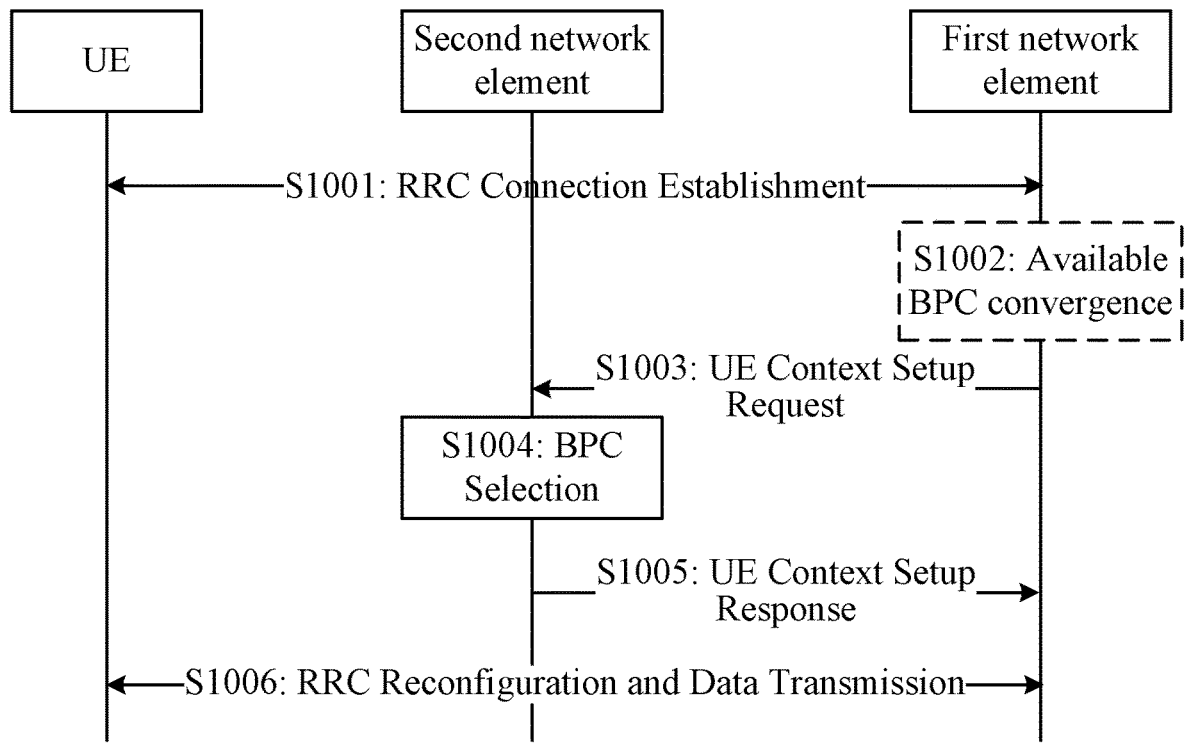
FIG. 10 is a flowchart of BPC capability configuration in scenario one according to embodiment three of the present application.

When a separate base station independently communicates with a UE, for an initially accessed UE, the second network element of the separate base station will select a BPC that should be used currently for the UE; in an embodiment, a first network element may provide a second network element with a range of available BPCs obtained after convergence, i.e., a BPC convergence list. A BPC selection process in this scenario is shown in FIG. 10 and includes steps S1001 to S1006.

In step S1001, in the RRC Connection Establishment process, the first network element and the second network element can determine a current serving cell of the UE; correspondingly, a current serving frequency band of the UE can also be determined in this process. Various RRC connection establishment processes may be used for the specific execution of the RRC Connection Establishment process, including, for example, but not limited to, a process exemplified in the standard protocol TS 38.401 v15.0.0.

In step S1002, Available BPC Convergence is performed, which is an optional step. The first network element can perform an Available BPC convergence operation according to the current radio resource configuration of the UE to obtain the BPC convergence list. For example, if the first network element determines that only a single serving cell is currently configured for the UE instead of configuring carrier aggregation (CA), the first network element may decide, according to the indication in the UE radio capability information, to converge the range of BPCs currently applicable to the UE (for example, assuming that the range of BPCs supported by the UE includes BPC #1 to BPC #5, such range can be carried in the UE radio capability information and corresponds to the serving frequency band of the UE), such as excluding some BPCs, i.e., BPC #3 to BPC #5, related to the CA to obtain a BPC convergence list including BPC #1 to BPC #2.

In step S1003, the BPC convergence list is sent to the second network element through a UE CONTEXT SETUP REQUEST message.

In this application scenario, the first network element can send the obtained BPC convergence list to the second network element through the interface between the network elements and various messages. For example, the obtained BPC list is carried in the UE CONTEXT SETUP REQUEST message and sent to the second network element through the UE CONTEXT SETUP REQUEST message. However, it should be understood that the obtained BPC list is not limited to being sent to the second network element through the UE CONTEXT SETUP REQUEST message.

If the first network element does not perform Available BPC Convergence, the UE CONTEXT SETUP REQUEST message does not include the BPC convergence list, that is, the existing message content may be kept unchanged. Of course, the UE CONTEXT SETUP REQUEST message can also be adjusted adaptively according to the requirements of a specific application scenario.

In step S1004, the second network element performs BPC selection for the UE, that is, executes BPC Selection.

In this step, the following case corresponds to S1002.

If the UE CONTEXT SETUP REQUEST message carries the BPC convergence list, the second network element selects a BPC applicable to the UE from the BPC convergence list (e.g., BPC #1 is selected from BPC #1 and BPC #2) according to the current radio resource situation and other information.

If the UE CONTEXT SETUP REQUEST message does not carry the BPC convergence list, the second network element determines the current serving frequency band of the UE according to the serving cell of the UE and the UE radio capability information carried in the UE CONTEXT SETUP REQUEST message, and then, selects a BPC (e.g., BPC #1 is selected from BPC #1 to BPC #5) applicable to the UE in the UE radio capability information in combination with the current radio resource situation and other information.

In an embodiment, the second network element configures the radio resources of the UE in combination with the BPC selected for the UE.

In step S1005, the second network element sends the BPC selected for the UE to the first network element through the UE CONTEXT SETUP RESPONSE message.

In step S1006, RRC Reconfiguration and Data Transmission are performed. When the UE communicates with the second network element, the second network element executes corresponding scheduling on the UE according to the selected BPC.

Scenario Two

Figure 11:
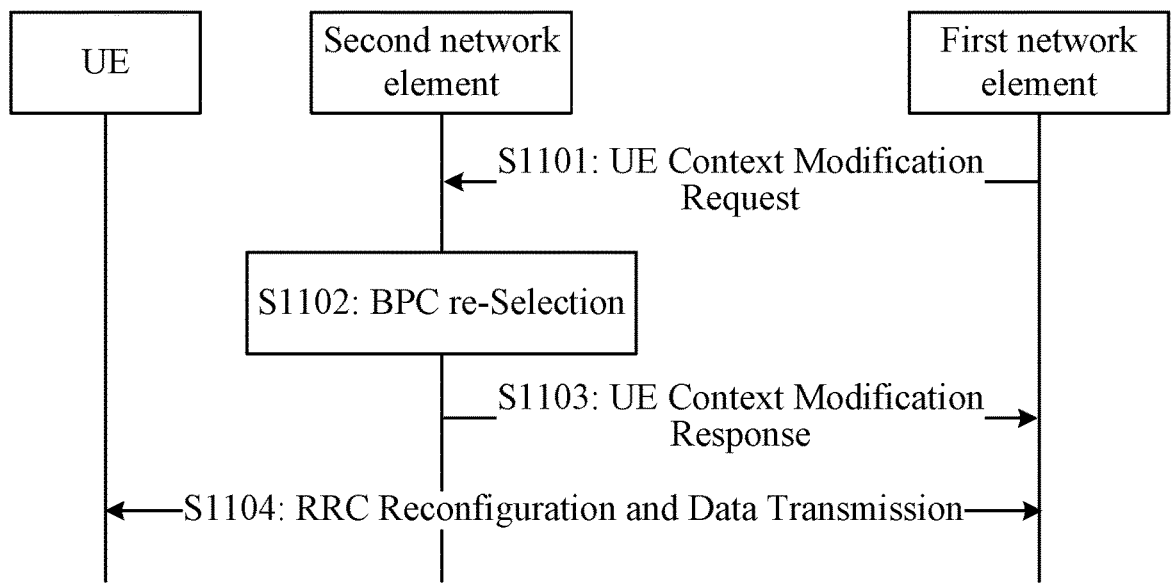
FIG. 11 is a flowchart of BPC capability configuration in scenario two according to embodiment three of the present application.

When a separate base station independently communicates with a UE and a first network element has reconfiguration requirements for the current serving cell or other radio resources of the UE in this scenario, a second network element will reconfigure a corresponding BPC for the UE; in an embodiment, the first network element may re-provide the second network element with a range of available BPCs obtained after convergence, i.e., a new BPC convergence list, according to the modified radio resource configuration. The BPC reconfiguration process in this case is shown in FIG. 11 and includes steps S1101 to S1104.

In step S1101, the first network element sends a UE CONTEXT MODIFICATION REQUEST message to the second network element.

In this embodiment, when the first network element decides to trigger UE Context Modification, for the modified radio resource configuration (such as at least one of changing the serving frequency band of the UE or configuring a CA cell for the UE), in an embodiment, the first network element can converge (such as excluding some BPCs, i.e., BPC #1 and BPC #/2, that are not applicable to the CA) the list of BPCs (such as including BPC #1 to BPC #5) currently applicable to the UE, and send a convergence list carried in the UE CONTEXT MODIFICATION REQUEST message to the second network element.

The execution process of UE context modification in this embodiment may adopt any process that can achieve UE context modification, which is not specially limited in this embodiment. For example, the UE context modification process exemplified in protocol TS 38.473 v15.0.0 may be adopted.

In step S1102, after receiving the UE CONTEXT MODIFICATION REQUEST message, the second network element performs BPC re-selection, i.e., executes BPC re-Selection.

In this step, if the UE CONTEXT MODIFICATION REQUEST message carries a new BPC convergence list, the second network element re-selects the BPC applicable to the UE from the BPC convergence list (e.g., BPC #3 is selected from BPC #3 to BPC #5, following the example of scenario one, that is, the BPC applicable to the UE is changed from BPC #1 to BPC #3). Then, the BPC re-selected for the UE is carried in the UE CONTEXT MODIFICATION RESPONS message with which the second network element subsequently replies to the first network element, i.e., the second network element indicates information about the re-selected BPC to the first network element.

If the UE CONTEXT MODIFICATION REQUEST message does not carry the new BPC convergence list, the second network element decides whether to change the BPC currently selected for the UE according to the modified radio resource configuration of the UE. If change occurs, the second network element indicates information about the changed BPC to the first network element in the UE CONTEXT MODIFICATION RESPONS message. If change does not occur, whether to carry BPC information is optional, and the BPC information may or may not be carried as required.

In an embodiment, the second network element considers the selected BPC when performing radio resource configuration.

In step S1103, the second network element replies to the first network element with the UE CONTEXT MODIFICATION RESPONS message.

In step S1104, RRC Reconfiguration and Data Transmission are performed. When the UE communicates with the second network element, the second network element executes corresponding scheduling on the UE according to the re-selected BPC.

Scenario Three

Figure 12:
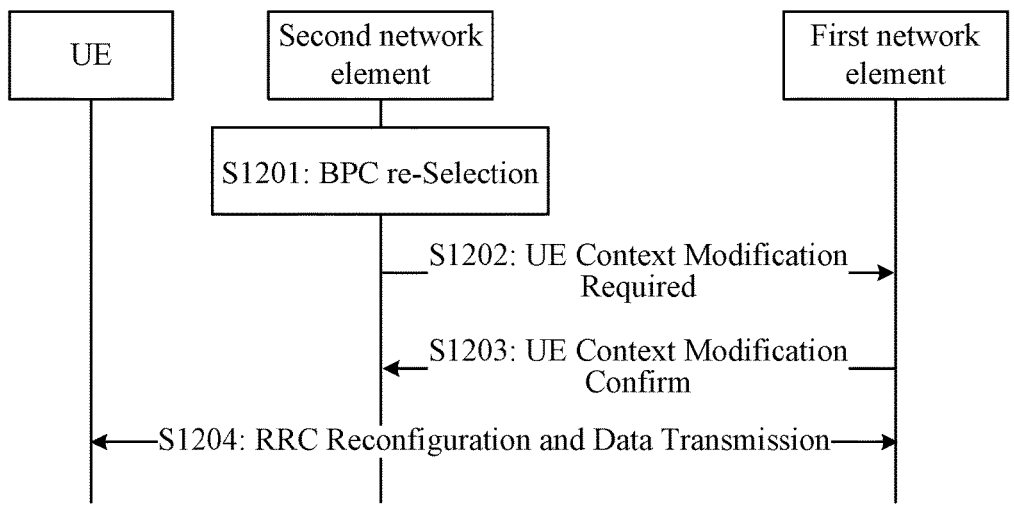
FIG. 12 is a flowchart of BPC capability configuration in scenario three according to embodiment three of the present application.

When a separate base station independently communicates with a UE, if a second network element decides to change the BPC currently used by the UE, the second network element indicates information about the changed BPC to a first network element. A BPC selection process in this case is shown in FIG. 12, and includes steps S1201 to S1204.

In step S1201, the second network element re-selects a BPC, that is, executes BPC re-Selection.

The second network element may decide to change the BPC currently used by the UE according to the current radio resource situation and other information of the second network element itself. Before the change decision is made, the second network element may have received a BPC convergence list (referring to description in scenarios one and two) indicated by the first network element, and the changed BPC may or may not be in the BPC convergence list.

In step S1202, the second network element notifies the first network element of the changed BPC through a UE CONTEXT MODIFICATION REQUIRED message.

In this embodiment, the implementation manner of UE context modification triggered by the second network element may adopt any context modification manner, for example, the implementation manner of UE context modification recorded in protocol TS 38.473 v15.0.0 may be adopted. This embodiment has no limitation thereto.

In step S1203, when the first network element agrees to the modification, the first network element sends a UE CONTEXT MODIFICATION CONFIRM message to the second network element.

In the example of this scenario, after receiving the UE CONTEXT MODIFICATION REQUIRED message, the first network element decides whether to agree to the request from the second network element according to the BPC and other information requested for modification in the UE CONTEXT MODIFICATION REQUIRED message from the second network element. If the first network element agrees, the first network element replies to the second network element with the UE CONTEXT MODIFICATION CONFIRM message; and if the first network element does not agree, the first network element may perform steps such as releasing or switching the second network element.

In step S1204, RRC Reconfiguration and Data Transmission are performed. When the UE communicates with the second network element, the second network element executes corresponding scheduling on the UE according to the re-selected BPC.

Scenario Four

Figure 13:
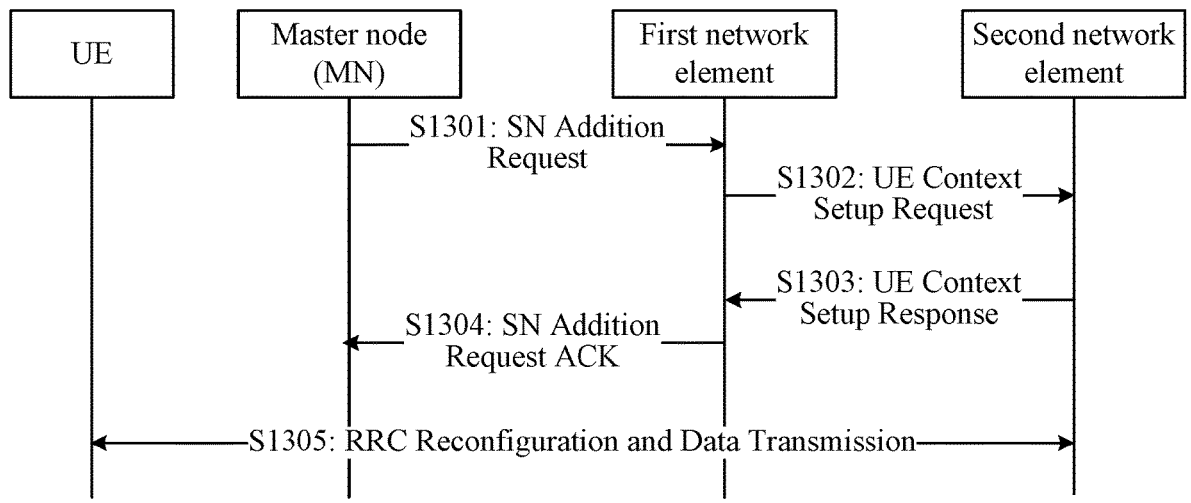
FIG. 13 is a flowchart of BPC capability configuration in scenario four according to embodiment three of the present application.

When a separate base station and other radio access network elements jointly provide communication services for the UE, taking the separate base station as an SN in a DC architecture as an example, a second network element will select a BPC currently applicable on the SN side for the UE; in an embodiment, a first network element may provide a BPC convergence list obtained after convergence for the second network element. A BPC selection process in this case is shown in FIG. 13, and includes steps S1301 to S1304.

In step S1301, in an SN Addition Request message sent by an MN to the first network element of the base station (as the SN), the MN indicates the frequency band list and BPC lists (taking BPC List 1 and BPC List 2 as examples in this embodiment) that the secondary node can configure for the UE.

In step S1302, after receiving the SN Addition Request message, the first network element selects a serving cell and a frequency band where the serving cell is located that are suitable for being configured for the UE.

In an embodiment, if the first network element decides to converge (e.g., it is defined that only BPC #1 and BPC #2 in BPC List 1 are available) the list of BPCs (e.g., BPC List 1, where BPC List 1 includes BPC #1 to BPC #5) currently applicable to the UE, the first network element indicates information about the BPC convergence list obtained after convergence to the second network element in a UE Context Setup Request message; and if the first network element decides not to converge the list of BPCs currently applicable to the UE, the current UE Context Setup Request message content can remain unchanged.

In step S1303, after receiving the UE Context Setup Request message, the second network element selects a BPC for the UE.

For the BPC selection process in this step, reference is made to S1004 in scenario one. Details are not repeated here.

In step S1304, after receiving a UE CONTEXT SETUP RESPONSE message, the first network element saves information about the BPC currently used by the UE and replies to the MN with an SN Addition Request ACK message. In an embodiment, the SN Addition Request ACK message includes information about the BPC allocated to the UE.

In step S1305, RRC Reconfiguration and Data Transmission are performed. When the UE communicates with the second network element, the second network element executes corresponding scheduling on the UE according to the selected BPC.

Scenario Five

Figure 14:
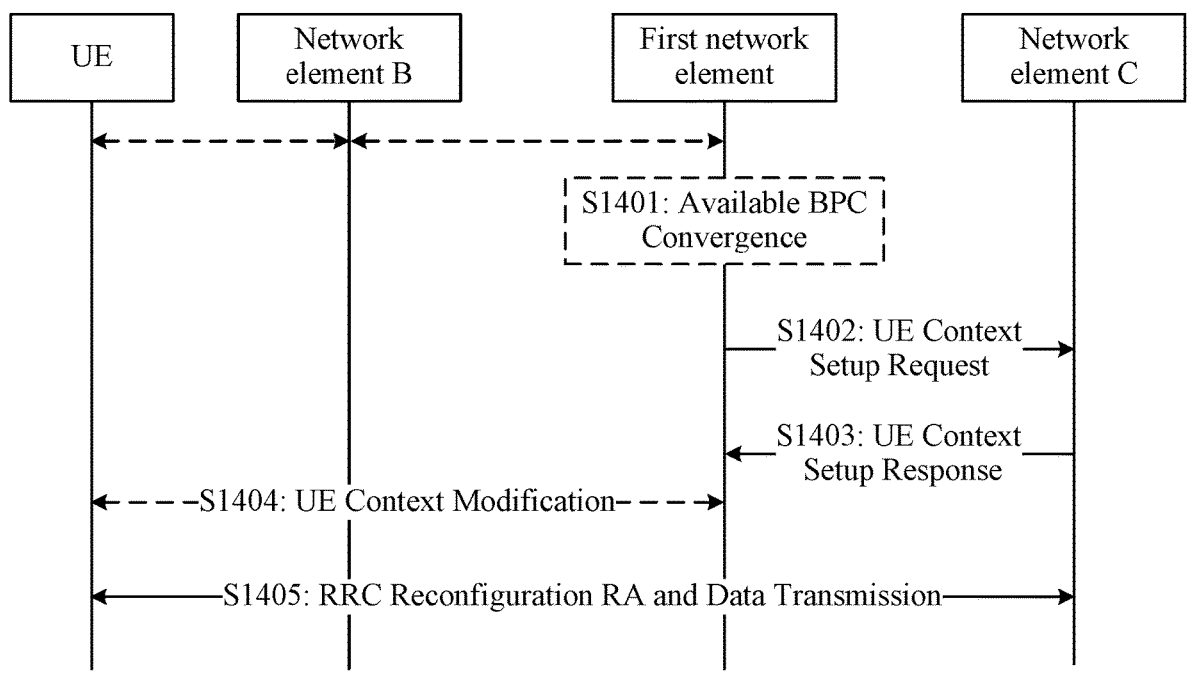
FIG. 14 is a flowchart of BPC capability configuration in scenario five according to embodiment three of the present application.

When a separate base station independently communicates with a UE, and the UE is connected to two second network elements (the two network elements are respectively referred to as a network element B and a network element C in this scenario) at the same time, the network element B and network element C will respectively select BPCs for the UE based on their respective information such as serving cells; in an embodiment, a first network element provides the network element B and/or network element C with the ranges of optional BPCs obtained after convergence, i.e., BPC convergence lists. This embodiment takes the procedure of adding the network element C as an example to illustrate the BPC selection process of the UE. The process is shown in FIG. 14 and includes steps described below.

In step S1401, the first network element can decide to add the network element C on the basis of the network element B according to information such as at least one of service requirements or radio environment of the UE so as to provide radio resources for the UE. The first network element decides the serving cell and serving frequency band of the UE under the network element C. In an embodiment, according to the radio capability information of the UE and the BPC currently used by the UE on the network element B side, for the range of BPCs adapted to the serving frequency band of the UE in the network element C (various BPCs in the range of BPCs may belong to the same or different BPC Lists), the first network element may also decide to perform Available BPC Convergence on the range of BPCs to obtain a BPC convergence list for the network element C. in this case, the first network element indicates the range of converged BPCs in the UE CONTEXT SETUP REQUEST message subsequently sent to the network element C, i.e., adding a BPC convergence list (or adding a BPC exclusion list in reverse, where the BPC exclusion list includes BPCs not suitable for the UE).

In step S1402, the first network element sends the UE CONTEXT SETUP REQUEST message to the network element C.

In step S1403, the network element C performs BPC selection after receiving the UE CONTEXT SETUP REQUEST message, and the selection process is similar to S1004 in scenario one and will not be repeated here; and the network element C feeds back a UE CONTEXT SETUP RESPONSE message including the selected BPC to the first network element.

In step S1404, after receiving the selected BPC indicated by the network element C, the first network element determines whether the BPC currently selected for the UE on the network element B side will be affected. In an embodiment, the first network element triggers UE Context Modification to the network element B. For the execution of the UE Context Modification, reference can be made to scenario two described above. In an embodiment, the first network element can indicate information about the BPC selected by the network element C side to the network element B. After reception of the information about the BPC, the network element B can determine by itself whether the BPC selected for the UE needs to be reconfigured.

When the network elements B and C schedule the UE, the coordination among the above three network elements can make the occupied UE radio capabilities not exceed the maximum BPC capability that the UE can support for the serving frequency band. Various existing algorithms may be adopted for BPC selection in the network element, which is not limited in this embodiment.

In step S1405, RRC Reconfiguration and Data Transmission are performed. When the UE communicates with the network element C, the network element C executes corresponding scheduling on the UE according to the selected BPC.

For a separated base station or a distributed base station having the structure of the first network element and the second network element in this embodiment, various configuration schemes for configuring the BPC for the UE by the BPC capability configuration device configured on the second network element are provided for accurately configuring the BPC for the UE, and the selected BPC can also be dynamically adjusted according to the specific BPC allocation situation, radio resource usage situation, radio resource configuration situation of the UE, and the like, thus enabling the BPC that should be currently used by the UE to be effectively and reasonably selected by the second network element. Thereby, when the UE is scheduled, full use can be made without exceeding the capability range of the UE, achieving reasonable maximization of the performance of the UE.

Apparently, it should be understood by those skilled in the art that each of the above-mentioned modules or steps in the embodiments of the present application may be implemented by a general-purpose computing apparatus, the modules or steps may be concentrated on a single computing device or distributed on a network composed of multiple computing devices, and alternatively, the modules or steps may be implemented by program codes executable by the computing devices, so that the modules or steps may be stored in a computer storage medium (such as a read-only memory (ROM)/random access memory (RAM), a magnetic disk or an optical disk) and executed by the computing devices. In some circumstances, the illustrated or described steps may be executed in sequences different from those described herein, or the modules or steps are made into various integrated circuit modules separately, or multiple modules or steps therein are made into a single integrated circuit module for implementation. Therefore, the present application is not limited to any specific combination of hardware and software.

What is claimed is:

1. A method, comprising:
   selecting, by a second network element of a base station, a baseband processing combination (BPC) for a user equipment, when in a process of the user equipment accessing the second network element; and
   sending, by the second network element to a first network element of the base station, the BPC selected for the user equipment,
   wherein the second network element is connected to the first network element.

2. The method of claim 1, comprising:
   receiving, by the second network element prior to the selecting of the BPC, a BPC convergence list from the first network element, wherein the BPC convergence list comprises at least one BPC supported by the user equipment and selected by the first network element; and
   selecting, by the second network element, the BPC for the user equipment from the BPC convergence list.

3. The method of claim 2, wherein the at least one BPC is selected from a BPC list received from a master node that a secondary node is allowed to configure for the user equipment, to form the BPC convergence list, wherein the second network element and the first network element belong to the secondary node.

4. The method of claim 1, comprising:
   re-selecting, by the second network element after selecting the BPC for the user equipment, the BPC for the user equipment.

5. The method of claim 4, comprising:
   receiving, by the second network element, a UE context modification request from the first network element, prior to re-selecting the BPC for the user equipment.

6. The method of claim 4, comprising:
   sending, by the second network element after re-selecting the BPC for the user equipment, the re-selected BPC to the first network element.

7. A second network element of a base station, comprising:
   at least one processor configured to:
     select a baseband processing combination (BPC) for a user equipment, when in a process of the user equipment accessing the second network element; and
     send, to a first network element of the base station, the BPC selected for the user equipment,
     wherein the second network element is connected to the first network element.

8. The second network element of claim 7, wherein the at least one processor is configured to:
   receive, prior to the selecting of the BPC, a BPC convergence list from the first network element, wherein the BPC convergence list comprises at least one BPC supported by the user equipment and selected by the first network element; and
   select the BPC for the user equipment from the BPC convergence list.

9. The second network element of claim 8, wherein the at least one BPC is selected from a BPC list received from a master node that a secondary node is allowed to configure for the user equipment, to form the BPC convergence list, wherein the second network element and the first network element belong to the secondary node.

10. The second network element of any one of claim 7, wherein the at least one processor is configured to:
    re-select, after selecting the BPC for the user equipment, the BPC for the user equipment.

11. The second network element of claim 10, wherein the at least one processor is configured to:
    receive a UE context modification request from the first network element, prior to re-selecting the BPC for the user equipment.

12. The second network element of claim 10, wherein the at least one processor is configured to:
    send, after re-selecting the BPC for the user equipment, the re-selected BPC to the first network element.

13. A non-transitory computer readable medium storing instructions, which when executed by at least one processor, cause the at least one processor to:
    select a baseband processing combination (BPC) for a user equipment, when in a process of the user equipment accessing a second network element of a base station; and
    send, to a first network element of the base station, the BPC selected for the user equipment,
    wherein the second network element is connected to the first network element.

14. The non-transitory computer readable medium of claim 13, further storing instructions, which when executed by at least one processor, cause the at least one processor to:
    receive, prior to the selecting of the BPC, a BPC convergence list from the first network element, wherein the BPC convergence list comprises at least one BPC supported by the user equipment and selected by the first network element; and
    select the BPC for the user equipment from the BPC convergence list.

15. The non-transitory computer readable medium of claim 14, wherein the at least one BPC is selected from a BPC list received from a master node that a secondary node is allowed to configure for the user equipment, to form the BPC convergence list, wherein the second network element and the first network element belong to the secondary node.

16. The non-transitory computer readable medium of claim 13, further storing instructions, which when executed by at least one processor, cause the at least one processor to:
    re-select, after selecting the BPC for the user equipment, the BPC for the user equipment.

17. The non-transitory computer readable medium of claim 16, further storing instructions, which when executed by at least one processor, cause the at least one processor to:
    receive a UE context modification request from the first network element, prior to re-selecting the BPC for the user equipment.

18. The non-transitory computer readable medium of claim 16, further storing instructions, which when executed by at least one processor, cause the at least one processor to:
    send, after re-selecting the BPC for the user equipment, the re-selected BPC to the first network element.

* * * * *